US009906356B2

(12) United States Patent
Shibata

(10) Patent No.: US 9,906,356 B2
(45) Date of Patent: Feb. 27, 2018

(54) TIMER SYNCHRONIZING SYSTEM IN LOOP COMMUNICATION CHANNEL

(71) Applicant: OKUMA Corporation, Niwa-gun, Aichi (JP)

(72) Inventor: Tomohiro Shibata, Aichi (JP)

(73) Assignee: OKUMA CORPORATION, Niwa-Gun, Aichi (JP)

( * ) Notice: Subject to any disclaimer, the term of this patent is extended or adjusted under 35 U.S.C. 154(b) by 0 days.

(21) Appl. No.: 15/372,799

(22) Filed: Dec. 8, 2016

(65) Prior Publication Data

US 2017/0170949 A1  Jun. 15, 2017

(30) Foreign Application Priority Data

Dec. 9, 2015  (JP) .................................. 2015-240367

(51) Int. Cl.
*H04L 7/00* (2006.01)
*H04L 12/40* (2006.01)
*H04L 12/26* (2006.01)
*H04J 3/06* (2006.01)

(52) U.S. Cl.
CPC .......... *H04L 7/0008* (2013.01); *H04J 3/0682* (2013.01); *H04L 7/0033* (2013.01); *H04L 12/40* (2013.01); *H04J 3/0685* (2013.01); *H04L 43/0852* (2013.01)

(58) Field of Classification Search
CPC ..... H04L 7/0008; H04L 7/0033; H04L 12/40; H04L 43/0852; H04L 43/106; H04J 3/0682; H04J 3/0685; H04J 3/0655; H04J 3/0667; H04J 3/0658
See application file for complete search history.

(56) References Cited

U.S. PATENT DOCUMENTS 6,185,217 B1  2/2001 Ando et al.

FOREIGN PATENT DOCUMENTS

JP   S61006953 A   1/1986
JP   H10164109 A   6/1998

*Primary Examiner* — Sophia Vlahos
(74) *Attorney, Agent, or Firm* — Cantor Colburn LLP

(57) ABSTRACT

In a system including a master station, slave stations, and a loop communication path for connecting the master and slave stations, the master station measures for each of the slave stations a transmission lag time from transmission of a communication frame in a forward direction through a loop communication channel in the master station to reception of the communication frame returned in a backward direction from the slave station, and calculates timer correction times for the slave stations based on both the transmission lag times measured for the slave stations and delay time information representing delay times caused by communication frame processing in the slave stations. Each of the slave stations includes a transmission/reception switch which switches a communication frame transmitting/receiving direction between the forward and backward directions in the loop communication channel, to allow timer synchronization in the loop communication path formed by the single communication channel.

2 Claims, 7 Drawing Sheets

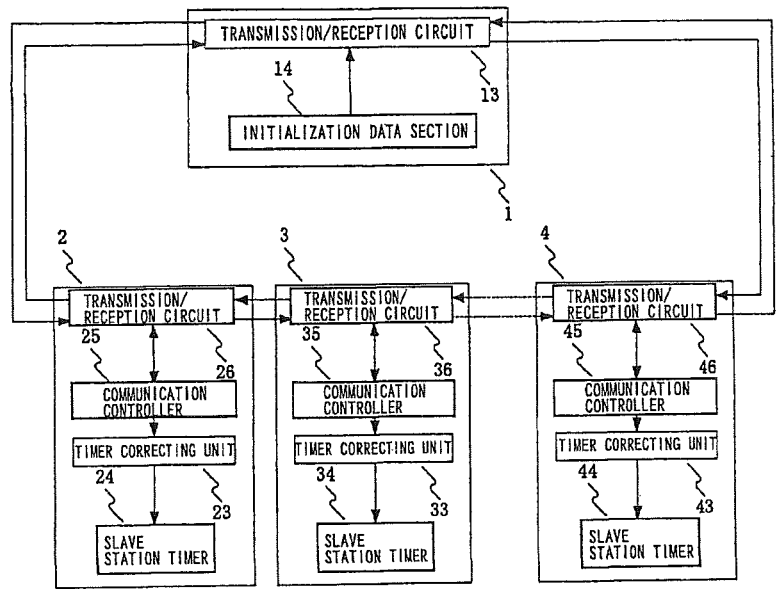
FIG. 6 "Prior Art"
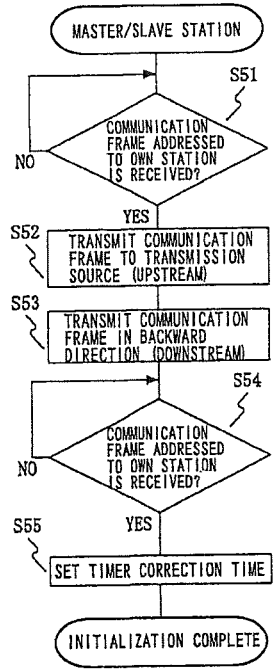
FIG. 7
"Prior Art"

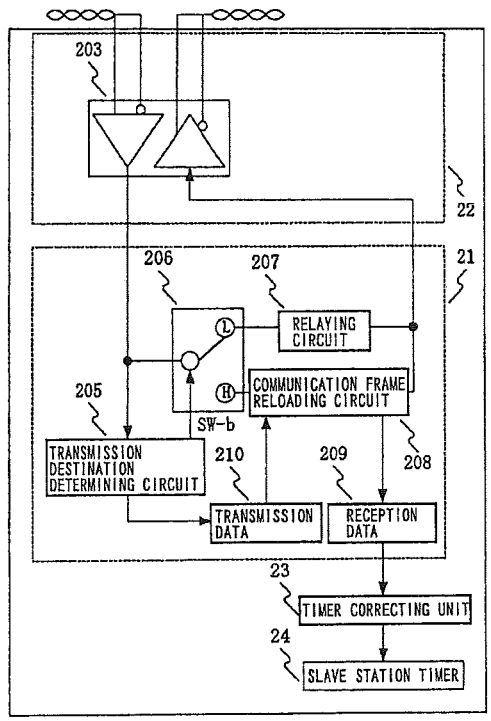
FIG. 8 "Prior Art"
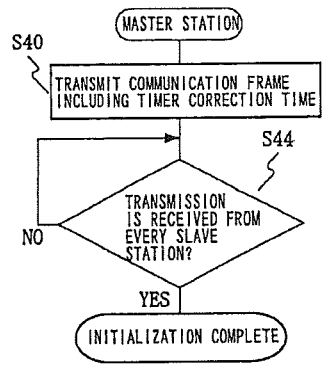
FIG. 9
"Prior Art"

TIMER SYNCHRONIZING SYSTEM IN LOOP COMMUNICATION CHANNEL

CROSS REFERENCE TO RELATED APPLICATION

The entire disclosure of Japanese Patent Application No. 2015-240367 filed on Dec. 9, 2015 including the specification, claims, drawings, and abstract is incorporated herein by reference in its entirety.

TECHNICAL FIELD

The present disclosure relates to a timer synchronizing system for a communication system in a loop communication channel, in which timers connected to slave stations in the communication channel are time synchronized with a high degree of accuracy.

BACKGROUND

With respect to one-to-one communication between a master station and a slave station through a loop communication channel, various attempts have been made to time synchronize a timer connected to each slave station in the communication channel with high accuracy.

FIG. 6 shows a block diagram of a timer synchronizing system according to a conventional technique. In a conventional example, as shown in FIG. 6, two communication channels are used to connect a master station 1 with slave stations 2 and 4 and connected between slave stations, to thereby establish bidirectional communication. The master station 1 transmits a communication frame from a transmission/reception circuit 13 to the slave station 2. The slave station 2 receives the communication frame in a transmission/reception circuit 26, and transmits the communication frame to a slave station 3 from the transmission/reception circuit 26. The slave station 3 receives the communication frame in a transmission/reception circuit 36 and transmits the communication frame to the slave station 4 from the transmission/reception circuit 36. The slave station 4 receives the transmission frame in a transmission/reception circuit 46 and transmits the communication frame to the master station 1 from the transmission/reception circuit 46. In this way, loop communication is established. Timer correcting sections 23, 33, and 43 owned by the slave stations correct corresponding slave station timers 24, 34, and 44 based on timer correction times.

FIG. 7 shows a flowchart of a process for setting a timer correction time during initialization of the master and slave stations in the conventional technique. Each of the slave stations waits until a communication frame addressed to the slave station itself is received (S51). After receiving the communication frame addressed to the slave station itself, the slave station transmits the received communication frame to a transmission source located upstream of the slave station (S52) and also transmits the communication frame to another slave station or the master station located downstream of the slave station (S53). Then, the downstream slave or master station waits for the transmission frame transmitted in S52 and S53 (S54), and sets the timer correction time upon receipt of the communication frame (S55).

More specifically, a timer correction time Ts is calculated based on both a communication frame transmission time To in S53 and a communication frame reception time Tr in S54 by the following Equation 1.

$$Ts=(To-Tr)/2 \quad \text{(Equation 1)}$$

Because outward and inward communications between the master station and the adjacent one of the slave stations and between adjacent ones of the slave stations are established over a constant distance, a lag in transmission from the slave station to the master station through the communication channels can be corrected using the timer correction time Ts, which is half the length of time taken to perform transmission and reception. In practice, however, because there is a communication lag caused by relay/reload processing in each of the slave stations, correction of the lag in transmission performed using only the timer correction time Ts will result in occurrence of a synchronous deviation.

FIG. 8 shows a block diagram of the slave station according to another example of the conventional technique. A transmitter/receiver 203 outputs received communication frame data. A transmission destination determining circuit 205 determines whether or not the communication frame data are addressed to its own slave station, and outputs, based on the determined result, a relay/reload switching signal SW-b. In response to the relay/reload switching signal SW-b, a relay/reload switch 206 outputs transmission data 210 through a communication frame reloading circuit 208 when the received transmission frame data are addressed to its own slave station, or outputs through a relaying circuit 207 the received transmission frame data without processing when the received communication frame data are addressed to another station.

The transmitter/receiver 203 outputs, as a communication frame, the data output by the relay/reload switch 206 to a next station. The communication frame reloading circuit 208 outputs, based on the received communication frame data, the timer correction value to the timer correcting unit 23. Based on the timer correction value, the timer correcting section 23 corrects the slave station timer 24 in the slave station in which the timer correcting section 23 is installed.

FIGS. 9 and 10 show flowcharts of a process to set the timer correction time in the master station and the slave station according to the conventional technique. Referring to FIG. 9, the master station 1 transmits to the slave stations 2, 3, and 4 a communication frame that contains timer correction time information obtained by summing up the correction values for synchronizing the timers and delay times caused by relay/reload processing in transit slave stations in the loop communication channel (S40). Referring next to the flowchart of FIG. 10, process steps performed in the slave station 2 are explained as an example. When the communication frame addressed to the slave station 2 is received from the master station 1 (S41), the slave station 2 switches the relay/reload switch 206 (see FIG. 8) to a communication frame reloading circuit side, to perform a communication frame reloading process, and transmits to the master station 1 the communication frame including information indicative of completion of timer correction. Then, the slave station 2 swiftly switches the relay/reload switch 206 to a relaying circuit side to become ready to perform a process of relaying the communication frame to another slave station (S42). Next, the timer correcting unit 23 (see FIG. 8) corrects the slave station timer 24 in the slave station 2 based on the timer correction time information contained in the communication frame (S43). Referring back to FIG. 9, the master station 1 completes initialization when the communication frame including information indicative of completion of timer correction is received from all of the slave stations (S44).

In the process steps as described above, times of the slave stations can be synchronized with the time of the master station in the loop communication channel even when the communication delay occurs due to relay/reload processing in each of the slave stations. In this way, accurate timer synchronization can be achieved even in communication accompanying the process of relaying/reloading the communication frame.

CITATION LIST

Patent Literature

Patent Literature 1: JP S61-6953 A
Patent Literature 2: JP H10-164109 A

SUMMARY

Technical Problem

The conventional technique shown in FIGS. 6 and 7 is based on the premise that two communication channels are used for connection between the master station 1 and the slave stations 2 and 4 and between the slave stations, to thereby enable bidirectional communication. However, this raises a problem in that costs are increased due to the necessity of the two communication channels for each connection between the stations. There is another problem in that because a measurable communication lag time is only an average of lag times in the two communication channels, the resulting measurement of the lag times is inaccurate. The conventional technique also suffers from a further problem in that the delay times caused by the relay/reload processing in the slave stations are not accurately obtained.

The present disclosure advantageously provides timer synchronization between a master station and slave stations with a high degree of accuracy while reducing costs associated with communication channels through which the master and slave stations are connected.

Solution to Problem

The present disclosure relates to a timer synchronizing system for synchronizing timers of a plurality of slave stations in a specific communication frame, the system having a master station, the plurality of slave stations, and a loop communication channel through which the master station and the slave stations are connected. In the timer synchronizing system, the master station includes a master station timer that measures, for each of the slave stations, a transmission lag time from transmission of the communication frame from the master station in a forward direction through the loop communication channel until the master station receives the communication frame which is returned along a backward direction through the communication channel from each of the slave stations having received the communication channel, a delay information storage unit that stores delay time information indicative of delay times taken to perform processing on the communication frame in the slave stations, a timer correction time calculator that calculates, based on both the transmission lag time measured for each of the slave stations and the delay time information, timer correction times, each of which corresponds to one of the slave stations, and a transmitter that transmits each of the timer correction times to corresponding one of the slave stations. Meanwhile, each of the slave stations includes a transmission/reception switch that switches a direction of transmitting/receiving the communication frame between the forward direction and the backward direction, and a timer correcting unit that corrects a timer in each of the slave stations based on corresponding one of the timer correction times which is associated with the each of the slave stations and transmitted from the master station.

Preferably, the delay times taken to perform processing on the communication frame in the slave stations include a relay delay time taken to perform a process of relaying the communication frame to another one of the slave stations and a reload delay time taken to perform a process of reloading the communication frame which is to be returned to the master station, the reload delay time being different from the relay delay time. Preferably, the timer correction time calculator calculates the timer correction time for the intended one of the slave stations based on the transmission lag times measured for the slave stations, the relay delay times that occur in one or more of the slave stations located between the master station and the intended one of the slave stations in the loop communication channel viewed along the forward direction, and the reload delay time that occurs in the intended one of the slave stations.

Advantageous Effects of Invention

According to the timer synchronizing system of this disclosure, timer synchronization between the master station and the slave stations can be achieved with a high degree of accuracy while reducing costs associated with a communication path on which the master station and the slave stations are connected.

BRIEF DESCRIPTION OF DRAWINGS

Embodiment of the present disclosure will be described by reference to the following figures, wherein:

FIG. 6 is a block diagram showing a conventional technique;

FIG. 7 is a flowchart showing process steps performed by a master/slave station in the conventional technique;

FIG. 8 is a block diagram showing the slave station according to another example of the conventional technique;

FIG. 9 is a flowchart showing process steps performed by the master station in the another example of the conventional technique.

DESCRIPTION OF EMBODIMENT

In the following, an embodiment of the present disclosure will be described with reference to the drawings.

Figure 1:
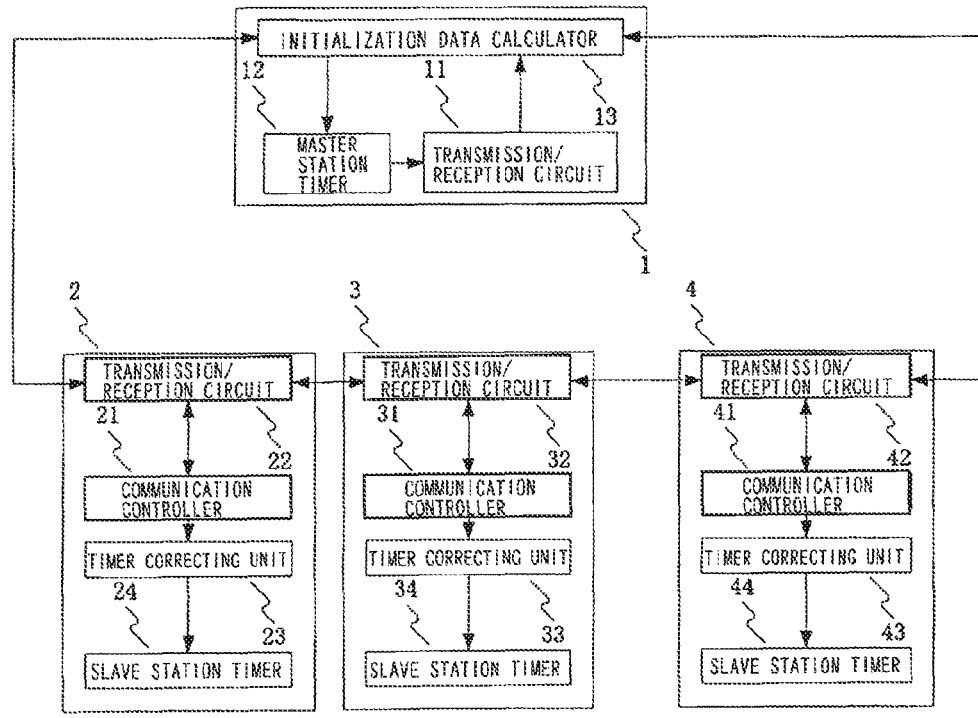
FIG. 1 is a block diagram showing an embodiment of the present disclosure.

FIG. 1 shows a block diagram of a timer synchronizing system according to an embodiment of the present disclosure. In FIG. 1 or below-described FIGS. 2 and 3, components having the same functions as those in components according to a conventional example (shown in FIG. 6 or FIG. 8) are identified with identical reference numerals to those in FIG. 6 or 8, and the descriptions related to the components will not be repeated.

In the present embodiment, as shown in FIG. 1, a single communication channel is used to connect between a master station 1 and slave stations 2 and 4, and between slave stations. In this way, costs associated with the communication channel are reduced relative to those associated with a communication channel in the prior art.

In the timer synchronizing system according to this embodiment, the master station 1 transmits a communication frame from a transmission/reception circuit 13 to the slave station 4 in addition to performing conventional loop communication for transmitting the communication frame from the master station 1 to the slave station 2. The slave station 4 receives in a transmission/reception circuit 42 the communication frame, and transmits the communication frame from the transmission/reception circuit 42 to a slave station 3. The slave station 3 receives in a transmission/reception circuit 32 the communication frame, and transmits the communication frame from the transmission/reception circuit 32 to the slave station 2. The slave station 2 receives in a transmission/reception circuit 22 the communication frame, and transmits the communication frame from the transmission/reception circuit 22 to the master station 1. In this way, bidirectional loop communication is performed by means of the single channel.

Figure 2:
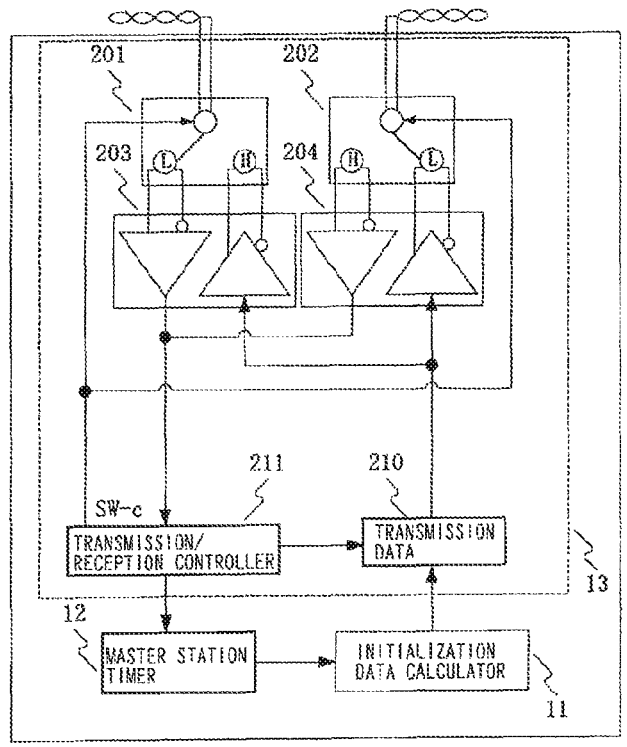
FIG. 2 is a block diagram showing a master station according to the embodiment of the present disclosure.

FIG. 2 shows a block diagram of the master station in the timer synchronizing system according to this disclosure. A transmitter/receiver 203 is connected via a transmission/reception switch 201 to a forward transmission side communication channel which is a communication path established along a forward direction in the loop communication channel (the communication path directed to the slave station 2 in the example of FIG. 1). Meanwhile, a transmitter/receiver 204 is connected via a transmission/reception switch 202 to a backward transmission side communication channel which is a communication path established along a backward direction in the loop communication channel (the communication path directed to the slave station 4 in the example of FIG. 1).

The transmitter/receiver 203 has an input circuit and an output circuit, with a connection to the forward transmission side communication channel switched between the input circuit and the output circuit by the transmission/reception switch 201. Similarly, the transmitter/receiver 204 has an input circuit and an output circuit, with a connection to the backward transmission side communication channel switched between the input circuit and the output circuit by the transmission/reception switch 202. The transmission/reception switches 201 and 202 switch the connections based on a switching signal SW-c sent from a transmission/reception controller 211.

More specifically, when the transmission/reception switches 201 and 202 receive an "H" level as the switching signal SW-c, the transmission/reception switch 201 connects the forward transmission side communication channel to the output circuit in the transmitter/receiver 203, while the transmission/reception switch 202 connects the backward transmission side communication channel to the input circuit in the transmitter/receiver 204. That is, in this situation, the master station 1 outputs the communication frame to the forward transmission side communication channel and receives the communication frame from the backward transmission side communication channel. On the other hand, when the transmission/reception switches 201 and 202 receive an "L" level as the switching signal SW-c, the transmission/reception switch 201 connects the forward transmission side communication channel to the input circuit in the transmitter/receiver 203, while the transmission/reception switch 202 connects the backward transmission side communication channel to the output circuit in the transmitter/receiver 204. In other words, this condition allows the master station 1 to output the communication frame to the backward transmission side communication channel and receive the communication frame from the forward transmission side communication channel.

In addition, the transmission/reception controller 211 outputs, to a master station timer 12, information indicative of a transmission time and a reception time of the communication frame. The master station timer 12 measures a length of time from the transmission time to the reception time, and outputs time measurement data indicative of the measured length of time to an initialization data calculator 11. The initialization data calculator 11 calculates and outputs a correction time for each of the slave stations based on both predetermined delay time information stored in a storage unit (not illustrated) of the master station 1 and the time measurement data received from the master station timer 12, the predetermined delay time information representing a delay time taken to perform a process of relaying/reloading the communication frame in each of the slave stations. Further, the transmission/reception controller 211 controls the communication frame stored in transmission data 210.

Figure 3:
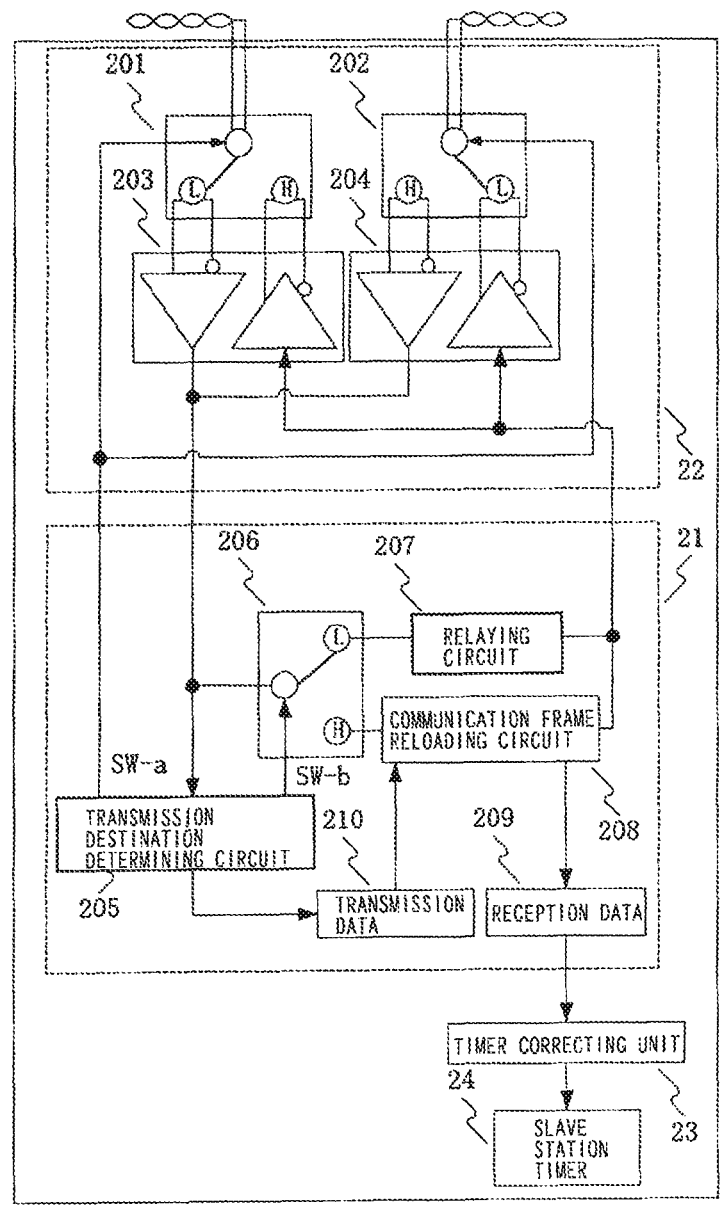
FIG. 3 is a block diagram showing a slave station according to the embodiment of the present disclosure.

FIG. 3 shows a block diagram of the slave station in the timer synchronizing system according to this embodiment. The transmitter/receiver 203 is connected via the transmission/reception switch 201 to the backward transmission side communication channel (which is, in the example of the slave station 2, the communication path toward the master station 1). Meanwhile, the transmitter/receiver 204 is connected via the transmission/reception switch 202 to the forward transmission side communication channel (which is, in the example of the slave station 2, the communication path toward the slave station 3).

As in the case of the master station 1, the transmission/reception switches 201 and 202 are also switched in the slave station based on a switching signal SW-a output from a transmission destination determining circuit 205. More specifically, when the transmission/reception switches 201 and 202 receive the "H" level as the switching signal SW-a, the transmission/reception switch 201 connects the backward transmission side communication channel to the output circuit in the transmitter/receiver 203, while the transmission/reception switch 202 connects the forward transmission side communication channel to the input circuit in the transmitter/receiver 204. In other words, this condition allows the slave station to output the communication frame to the backward transmission side communication channel and receive the communication frame from the forward transmission side communication channel. On the other hand, when the transmission/reception switches 201 and 202 receive the "L" level as the switching signal SW-a, the transmission/reception switch 201 connects the backward transmission side communication channel to the input circuit in the transmitter/receiver 203, while the transmission/reception switch 202 connects the forward transmission side communication channel to the output circuit in the transmitter/receiver 204. In other words, this condition allows the slave station to output the communication frame into the forward transmission side communication channel and receive the communication frame from the backward transmission side communication channel.

In response to a relay/reload switching signal SW-b, a relay/reload switch 206 outputs, when data in the received communication frame are addressed to its own slave station, the transmission data 210 via a communication frame reloading circuit 208, or outputs via a relaying circuit 207 the data in the received communication frame without processing when the data in the received frame are addressed to another slave station.

Meanwhile, the transmission destination determining circuit 205 further controls the communication frame to be stored in the transmission data 210. The communication frame reloading circuit 208 outputs the timer correction value to the timer correcting unit 23 based on the data in the received communication frame. The timer correcting unit 23 corrects a slave station timer 24 contained in its own slave station based on the timer correction value.

Figure 4:
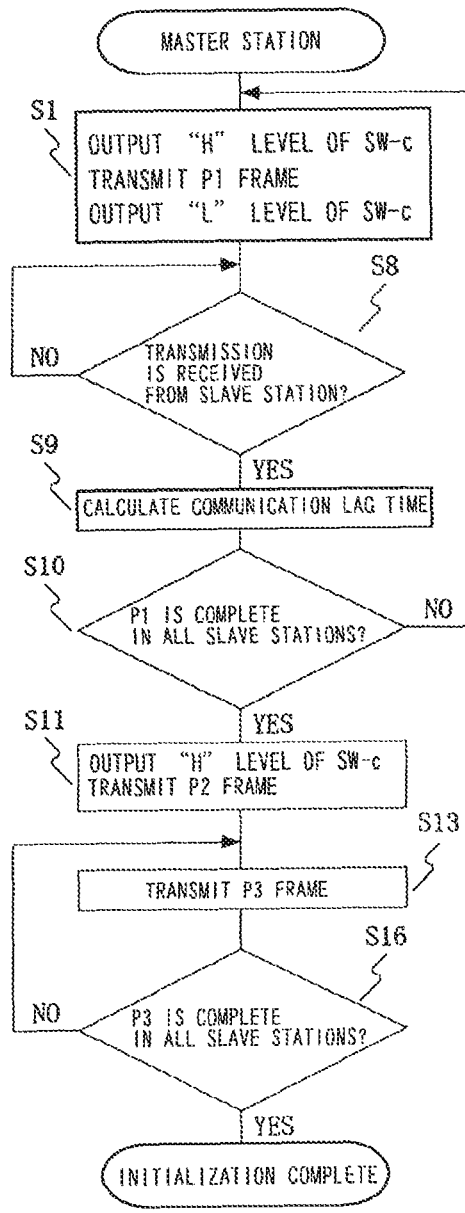
FIG. 4 is a flowchart showing process steps performed by the master station according to the embodiment of the present disclosure.
Figure 5:
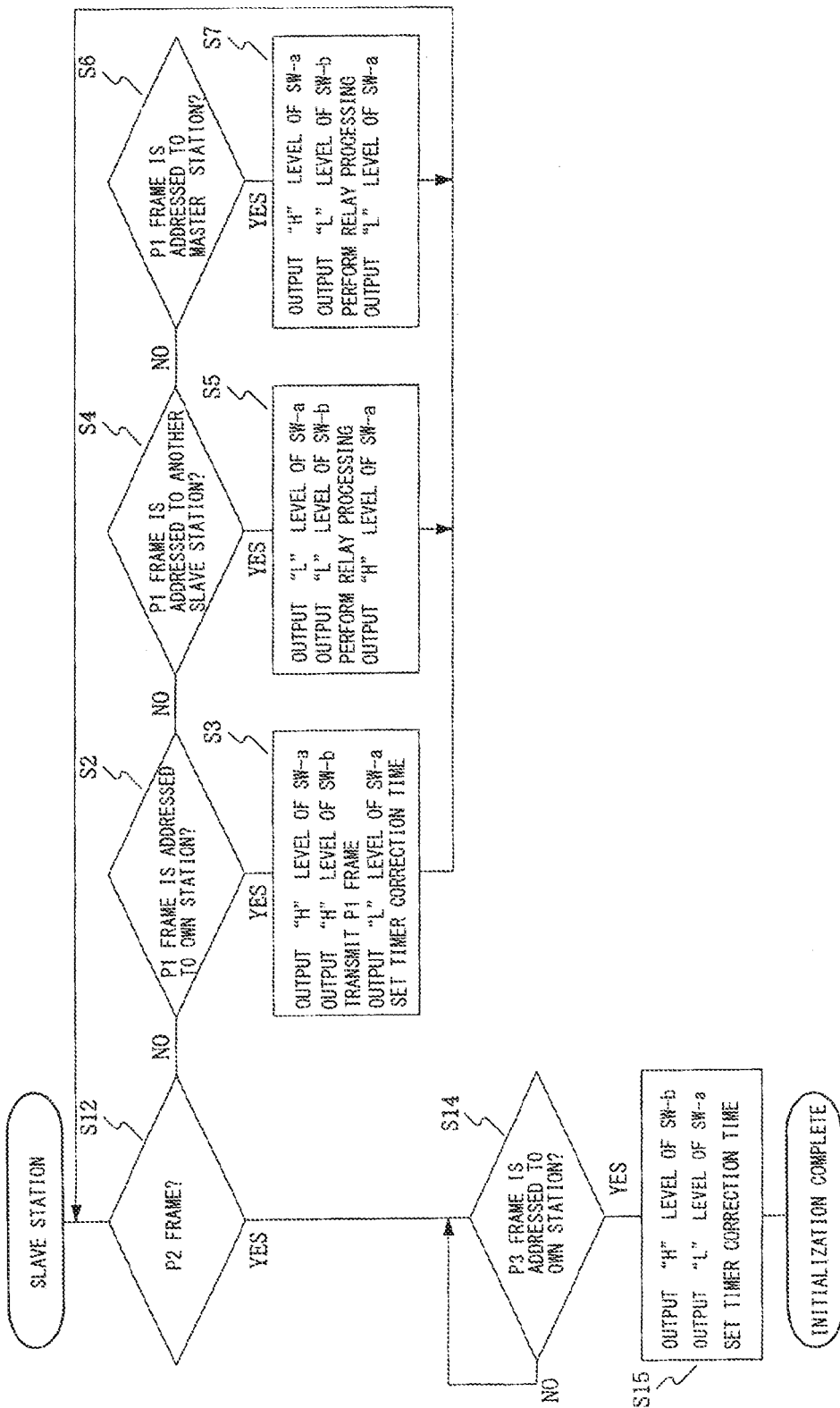
FIG. 5 is a flowchart showing process steps performed by the slave station according to the embodiment of the present disclosure.
Figure 10:
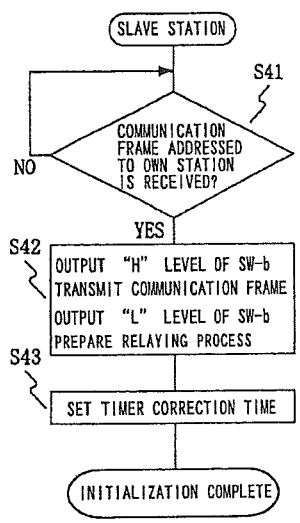
FIG. 10 is a flowchart showing process steps performed by the slave station in the another example of the conventional technique.

FIGS. 4 and 5 show flowcharts of a process of setting the timer correction time in the master station and the slave station according to this embodiment, respectively. Firstly, in the master station 1, the transmission/reception controller 211 outputs the "H" level as the switching signal SW-c to the transmission/reception switches 201 and 202. As a result, a P1 frame, which is a communication frame for measuring the lag time, is output into the forward transmission side communication channel (i.e. toward the slave station 2). Then, the transmission/reception controller 211 outputs the "L" level as the switching signal SW-c. In other words, the master station 1 is turned into a state of readiness to receive, from the forward transmission side communication channel, the communication frame that has been sent from the slave station in a backward direction (S1).

Referring next to FIG. 5, the process performed in the slave station is explained by way of illustration. The slave station 2 determines whether or not the received frame is a P2 frame (S12), which will be described below. In this example, as the received frame is the P1 frame, operation moves to step 2. When the slave station 2 receives the P1 frame addressed to the slave station 2 itself (S2), the transmission destination determining circuit 205 outputs the "H" level as the switching signal SW-a and also outputs the "H" level as the switching signal SW-b. In other words, circuitry is switched to send the P1 frame to the timer correcting unit 23, and turned into a state capable of transmitting the communication frame toward the backward transmission side communication channel (the communication path toward the master station 1). Then, the P1 frame is transmitted to the backward transmission side communication channel Following this, the transmission destination determining circuit 205 outputs the "L" level as the switching signal SW-a to re-establish a state capable of receiving the communication frame from the backward transmission side communication channel and transmitting the communication channel to the forward transmission side communication channel. In other words, a preparation for a process to relay the P1 frame addressed to another slave station or a preparation for a process to receive the P2 frame is made (S3).

In the slave station 2 that receives the P1 frame addressed to another slave station (S4), the switching signal SW-a of the "L" level and the switching signal SW-b of the "L" level are output (i.e., the switching signals SW-a and SW-b are maintained at the "L" level), to transmit the P1 frame to the forward transmission side communication channel. This means that relay processing is performed. Subsequent to this, the "H" level is assigned to the switching signal SW-a to prepare the process of relaying the P1 frame transmitted along the backward direction from another slave station (which in the example of FIG. 1 is the slave station 3 or 4) located on the forward transmission side of the slave station 2 (S5).

In the slave station 2 that receives the P1 frame addressed to the master station 1 (S6), the switching signal SW-a set at the "H" level and the switching signal SW-b set at the "L" level are output, to transmit the P1 frame to the backward transmission side communication channel. In other words, processing to return the P1 frame is performed. Subsequent to this, the switching signal SW-a set at the "L" level is output to prepare the process of relaying the P1 frame or the process of receiving the P2 frame (S7).

Referring back to FIG. 4, the master station 1 measures each length of time from transmission of the P1 frame to the slave stations until the master station receives the P1 frame returned from the slave stations by means of the master station timer 12, and outputs the measured lengths as time measurement data. The initialization data calculator 11 respectively calculates timer correction times for the slave stations based on both the predetermined delay times taken to perform the process of relaying/reloading the communication frame in the slave stations and the time measurement data (S9). When time measurements are complete with respect to all of the slave stations in the communication channel (S10), the master station 1 transmits the P2 frame to all of the slave stations (S11).

Referring to FIG. 5 again, the slave stations receive the P2 frame and prepare the process of receiving a P3 frame. The master station 1 transmits the P3 frame including information indicative of the timer correction times to each of the slave stations (S13). When the slave stations receive the P3 frame addressed to the slave stations themselves, respectively (S14), the slave stations output the switching signal SW-b set to the "H" level and the switching signal SW-a set to the "L" level, and accordingly get ready to perform the process of relaying the P3 frame addressed to another one of the slave stations or perform communication along the forward direction (S15). Here, the initialization is complete.

Specifically, when the P1 frame is transmitted from the master station 1 to the slave station 2 and returned therefrom to the master station 1, an amount of time T12 from transmission to reception of the P1 frame in the master station 1 is expressed by the following Equation 2.

$$T12 = Td12 + Td2 + Td21 \quad \text{(Equation 2)}$$

In Equation 2, Td12 represents an amount of lag time from transmission at the master station 1 to reception at the slave station 2, Td2 represents an amount of delay time taken to perform in the slave station 2 the process of relaying/reloading the communication frame, and Td21 represents an amount of lag time from transmission at the slave station 2 to reception at the master station 1.

Here, because the amounts Td12 and Td21 are mainly determined by lengths of transmission and reception paths, which are established on the same communication channel, it can be assumed that Td12=Td21. On the other hand, the amount Td2, which is determined depending on a circuit and a program, can be previously measured and set with high accuracy. Therefore, a timer correction time Ts2 for the slave station 2 is set to a value obtained by the following Equation 3.

$$Ts2 = (T12 - Td2)/2 \quad \text{(Equation 3)}$$

When the P1 frame is transmitted from the master station 1 to the slave station 3 and returned therefrom to the master station 1, an amount of time T13 from transmission to reception of the P1 frame in the master station 1 is expressed by the following Equation 4.

$$T13 = Td12 + Td2 + Td23 + Td3 + Td32 + Td2 + Td21 \quad \text{(Equation 4)}$$

In Equation 4, Td23 represents an amount of lag time from transmission at the slave station 2 to reception at the slave station 3, Td3 represents an amount of delay time taken to perform in the slave station 3 the process of relaying/reloading the communication frame, and Td32 represents an amount of lag time from transmission at the slave station 3 to reception at the master station 1.

Here, because the amounts Td23 and Td32 are mainly determined by the length of transmission and reception paths, it can be assumed that Td23=Td32. Meanwhile, the amount Td3, which is determined depending on the circuit and the program, can be previously measured and set with high accuracy, while the sum of the amounts Td12, Td2, and Td21 is already obtained as the amount T12 of time by Equation 2. Therefore, a timer correction time Ts3 for the slave station 3 is set to a value obtained by the following Equation 5.

$$Ts3 = (T13 - T12 + Td2 - Td3)/2 \quad \text{(Equation 5)}$$

According to the present disclosure, as described above, the timers can be synchronized between the master station and the slave stations with a high degree of accuracy and without being affected by the transmission lags that differ depending on the communication paths between the master station and the slave stations. In addition, because there are many PHY chips for Ethernet that are inexpensive and capable of switching between two transmission/reception circuits and between a transmission source and a transmission destination, timer synchronization can be achieved using such PHY chips at low costs in a minimized packaging area.

Meanwhile, the process of relaying the communication frame and the process of reloading the communication frame may take different amounts of time depending on the circuit and the program. In this case, when the P1 frame is transmitted from the master station 1 to the slave station 2 and returned therefrom to the master station 1, the amount T12 of time from transmission to reception of the P1 frame in the master station 1 is expressed by the following Equation 6.

$$T12 = Td12 + Td2c + Td21 \quad \text{(Equation 6)}$$

In Equation 6, Td12 represents the amount of lag time from transmission at the master station 1 to reception at the slave station 2, Td2c represents an amount of delay time taken to perform in the slave station 2 the process of reloading the communication frame, and Td21 represents the amount of lag time from transmission at the slave station 2 to reception at the master station 1.

Here, because the amounts Td12 and Td21 are mainly determined by the lengths of transmission and reception paths, which are established on the same communication channel, it can be assumed that Td12=Td21. In addition, the amount Td2c, which is determined depending on the circuit and the program, can be previously measured and set with high accuracy. Therefore, the timer correction time Ts2 for the slave station 2 is set to a value obtained by the following Equation 7.

$$Ts2 = (T12 - Td2c)/2 \quad \text{(Equation 7)}$$

When the P1 frame is transmitted from the master station 1 to the slave station 3 and returned therefrom to the master station 1, the amount T13 of time from transmission to reception of the P1 frame in the master station 1 is expressed by the following Equation 8.

$$T13 = Td12 + Td2b + Td23 + Td3c + Td32 + Td2b + Td21 \quad \text{(Equation 8)}$$

In Equation 8, Td2b represents an amount of delay time taken to perform in the slave station 2 the process of relaying the communication frame, Td23 is the amount of lag time from transmission at the slave station 2 and reception at the slave station 3, Td3c is an amount of delay time taken to perform in the slave station 3 the process of reloading the communication frame, and Td32 represents the amount of lag time from transmission at the slave station 3 to reception at the master station 1.

Here, because the amounts Td23 and Td32 are mainly determined by the lengths of transmission and reception paths, it can be assumed that Td23=Td32. In addition, the amounts Td2b and Td3c, which are determined depending on the circuit and the program, can be previously measured and set with high accuracy, and the sum of the amounts Td12, Td2c, and Td21 is calculated as the amount T12 of time by Equation 6. Therefore, the timer correction time Ts3 for the slave station 3 is set to a value obtained by the following Equation 9.

$$Ts3 = (T13 - T12 + Td2c - Td3c)/2 \quad \text{(Equation 9)}$$

According to the present disclosure, as described above, even when the amount of time taken to relay the communication frame differs from that taken to reload the communication frame, timer synchronization can be achieved between the master station and the slave stations with high accuracy.

Although this disclosure has been described with respect to the embodiment, the disclosure is not limited to the above-described embodiment, and the embodiment may be changed in various ways without departing from the scope of the disclosure.

REFERENCE SIGNS LIST

1 master station; 2, 3, 4 slave station; 11 initialization data calculator; 12 master station timer; 13, 22, 26, 32, 36, 42, 46 transmission/reception circuit; 14 initialization data section; 21, 25, 31, 35, 41, 45 communication controller; 23, 33, 43 timer correcting unit; 24, 34, 44 slave station timer; 201, 202 transmission/reception switch; 203, 204 transmitter/receiver; 205 transmission destination determining circuit; 206 relay/reload switch; 207 relaying circuit; 208 communication frame reloading circuit; 209 reception data; 210 transmission data.

The invention claimed is:

1. A timer synchronizing system for synchronizing timers in a plurality of slave stations at a specific communication frame, comprising:
  a master station;
  the plurality of slave stations, and
  a loop communication channel through which the master station and the plurality of slave stations are connected, wherein;
  the master station comprises,
    a master station timer that measures for each of the plurality of slave stations a transmission lag time from transmission of the communication frame from the master station along a forward direction through the loop communication channel until the master station receives the communication frame which is returned along a backward direction through the loop communication channel from each of the plurality of slave stations having received the communication frame, a delay information storage that stores delay time information indicative of a plurality of delay times respectively taken to perform processing on the communication frame in the plurality of slave stations, a timer correction time calculator that calculates, based on both the transmission lag time measured for each of the plurality of slave stations and the delay time information, a plurality of timer correction times, each of which corresponds to one of the plurality of slave stations, and a transmitter that transmits each of the plurality of timer correction times to a corresponding one of the slave stations; and each of the plurality of slave stations comprises, a transmission/reception switch that switches a direction of transmitting/receiving the communication frame between the forward direction and the backward direction, and a timer correcting unit that corrects a timer in the each of the plurality of slave stations based on corresponding one of the plurality of timer correction times associated with the each of the plurality of slave stations and transmitted from the master station.

2. The timer synchronizing system according to claim 1, wherein:

the delay times taken to perform processing on the communication frame in the plurality of slave stations comprise a relay delay time taken to perform a process of relaying the communication frame to another one of the slave stations and a reload delay time taken to perform a process of reloading the communication frame to be returned to the master station, the reload delay time being different from the relay delay time, and the timer correction time calculator calculates the timer correction time for an intended one of the plurality of slave stations based on the transmission lag time measured for each of the plurality of slave stations, the relay delay times that occur in one or more of the plurality of slave stations located between the master station and the intended one of the plurality of slave stations in the loop communication channel viewed along the forward direction, and the reload delay time that occur in the intended one of the slave stations.

* * * * *